May 20, 1924.

C. L. REIZENSTEIN 1,494,630

METHOD OF ORNAMENTING GLASSWARE

Filed June 1, 1923

WITNESSES
J. Herbert Bradley.

INVENTOR
Charles L. Reizenstein
By Green and McCallister
His Attorneys.

Patented May 20, 1924.

1,494,630

UNITED STATES PATENT OFFICE.

CHARLES L. REIZENSTEIN, OF PITTSBURGH, PENNSYLVANIA.

METHOD OF ORNAMENTING GLASSWARE.

Application filed June 1, 1923. Serial No. 642,750.

*To all whom it may concern:*

Be it known that I, CHARLES L. REIZENSTEIN, a citizen of the United States, and a resident of Pittsburgh, in the county of Allegheny and the State of Pennsylvania, have made a new and useful Invention in Method of Ornamenting Glassware, of which the following is a specification.

This invention relates to the art of ornamenting glass and glazed ceramic ware. It is now common to acid etch designs in glassware and where the ware is etched so that the design is in relief, it is common to coat the design and the etched background with gold paint to produce gold encrusted ware. In acid-etching the design, either as a positive where the design stands in relief, or as a negative where the design is sunken, the design is printed on the glassware with an acid resisting ink. The entire article aside from the design and the background then is covered with acid resisting wax or similar material and the article then immersed in suitable acid until the etching has progressed to the desired depth. The glass article is then washed and the wax removed.

An object of this invention is to take advantage of the well-known etching processes and provide a method whereby highly artistic effects resembling metal inlay work may be rapidly produced on glassware and glazed ceramic ware.

Another object is the provision of a method whereby glassware may be easily and relatively cheaply provided with intricate designs of one color and a background of another color.

A still further object is the provision of a method whereby crystal glassware may be easily and cheaply provided with a two color border of intricate design.

A still further and more limited object is to provide a method whereby crystal glassware such as plates, saucers, etc., may be readily and relatively cheaply provided with an intricate colored border design having a gold background.

Since the glaze on glazed ceramic ware is glass it may be etched in the same manner as glass articles and certain steps of this method may be utilized in the ornamentation of glazed ceramic ware.

Figure 1:
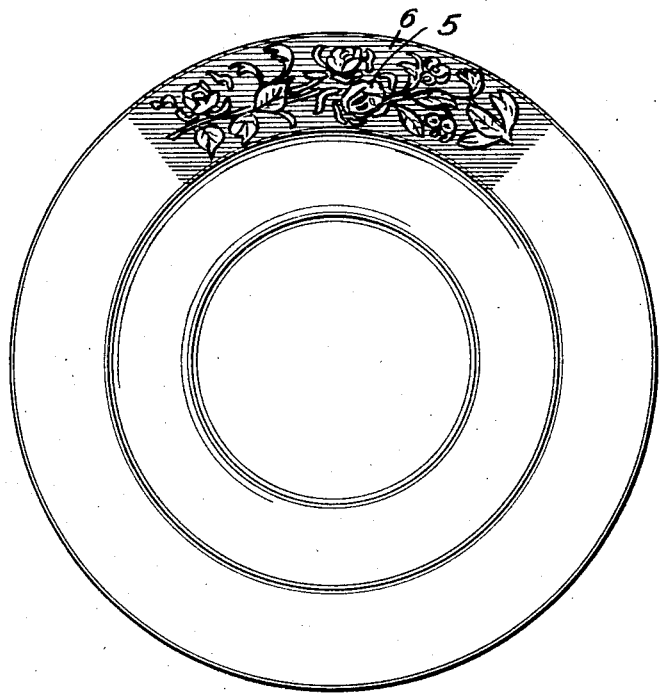
Figure 2:
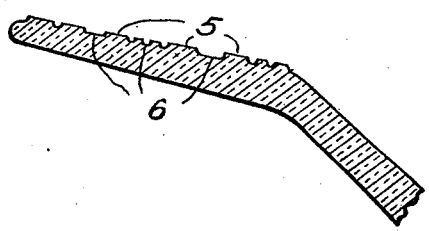
Figure 3:
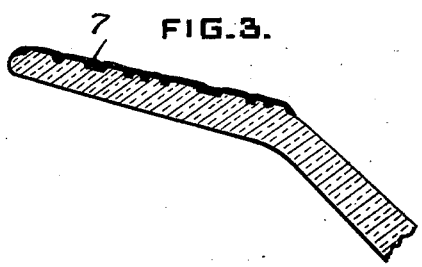
Figure 4:
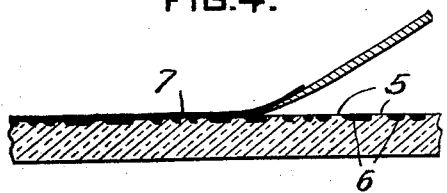

The above, as well as other objects which will readily appear to those skilled in this particular art, I attain by means of the method described in the specification and illustrated in the drawings accompanying and forming a part of this application, in which Figure 1 diagrammatically illustrates a glass or glazed ceramic plate provided with a portion of a border design made in accordance with this invention. Figs. 2, 3, and 4 are sectional views through the border portion of the ware and illustrate certain of the steps used in carrying out my method; and steps, such as printing the design, etching, etc., are too well-known to need illustration.

In carrying out this method, the design (positive) is printed on the portion of the ware to be ornamented with ink which resists the acid used for etching. This is done in the manner usual in glass etching. The ware (aside from the printed design and the portion to be etched) is then covered with wax or other acid resisting material and the ware immersed in a bath of etching acid where it is left until the background is etched to the desired depth.

In this method, it is necessary to etch the background to a greater depth than is usual either where the design proper has been etched, leaving a plain background or where used for forming a basis for encrusted ware.

After the glassware or glazed ceramic ware has been etched to the proper depth, it is removed from the bath, then washed and the wax or other coating compound removed. At this stage of the method, the design stands in bold relief with an etched background.

The design and background is then coated with the color material in the form of a paste or relatively thick paint. The color may be any desired or may be gold or other metal. It is preferable to put enough color over the etched background to equal the depth of the etching.

Before the color has had an opportunity to set, that portion of it standing above the surface of the glass of the design is cut away, leaving the design surrounded by the colored background.

I have found that a satisfactory manner of cutting away the paste or paint standing above the surface of the glass of the design is to use a sharp, flexible metal blade similar to the flexible steel blades of the modern safety razor. In most cases, the surface of the glass of the design will serve as a guide for the blade, so that if the blade bears on the design and is moved across or along the same, the surplus paste or paint may be readily and cheaply removed. After this operation, the color is fired, thus finishing the ware.

By means of this method, I am enabled to produce ornamented glassware which resembles gold inlay, that is, glassware in which the design has the appearance of having an inlaid background.

By applying color to the back of crystal glassware, firing the same and then applying this method to the front surface of the ware, I am enabled to produce a colored design with a gold background or a background of another color resembling inlay.

When it is desired to ornament glazed ceramic ware, the design is etched on the ware in the same manner as when working on glassware and the background surrounding the design is applied in the manner above set forth. In utilizing this method to decorate glazed ceramic ware, it is preferable to first color that portion of the ware where the design is to be placed then to fire the same. The design is next printed on the ware and the glass surrounding the design and forming the background for the design is then etched away as with glassware. The color or gold may then be applied as with glassware and the surplus removed in the same manner.

In Fig. 1, I have shown a glass or glazed ceramic plate having a portion of the border thereof ornamented in accordance with this invention. The design 5 is surrounded by a color border 6.

When the border of the glass or glazed ceramic ware is etched, the design will stand in relief as shown at 5, Fig. 2, and the background will be sunken around the design. The color material 7 is then applied over the background and design as shown in Fig. 3. Fig. 4 illustrates the method of removing or cutting away that portion of the color coat which stands above the surface of the design. The left-hand portion of Fig. 4 shows the color coat over the design while the right-hand portion of said figure shows this removed.

Having thus described my invention, what I claim is:—

1. The method of ornamenting glass or glazed ceramic ware, which consists in producing a design thereon, in etching sufficient of the surface of the ware surrounding the design to form a background, in covering the design and etched portion with coating material, in removing the coating material covering the design while leaving that covering the etched portion and then in firing the ware.

2. The method of ornamenting glass or glazed ceramic ware, which consists in printing a design thereon with etching acid resisting ink, in etching relatively deeply around said design to form a background, in covering the etched portion and design with relatively stiff paint, in cutting away the paint projecting above the design and then in firing the ware.

3. The method of ornamenting glass or glazed ceramic ware, which consists in coating portions of the surface of the ware with acid resisting material, in etching relatively deeply the surface of the ware immediately adjacent the coated portions, in covering the etched portions with metallic paint, in cutting away the paint projecting beyond the surface of the ware immediately adjacent the etched portion and then in firing the ware.

4. The method of ornamenting glassware, which consists in coloring a portion of the back thereof, in firing the color, in printing a design on the face of the ware opposite said color, in etching the face of the ware surrounding the design above said color to form a background for the design, in covering the etched portion and design with relatively stiff color material, in removing the color material above the design while leaving that above the etched portion and then in firing the ware.

In testimony whereof, I have hereunto subscribed my name this 28th day of May, 1923.

CHARLES L. REIZENSTEIN.